Dec. 31, 1929.  O. GANTNER  1,741,835
DAMPING DEVICE FOR CORNETS
Filed Nov. 4, 1927
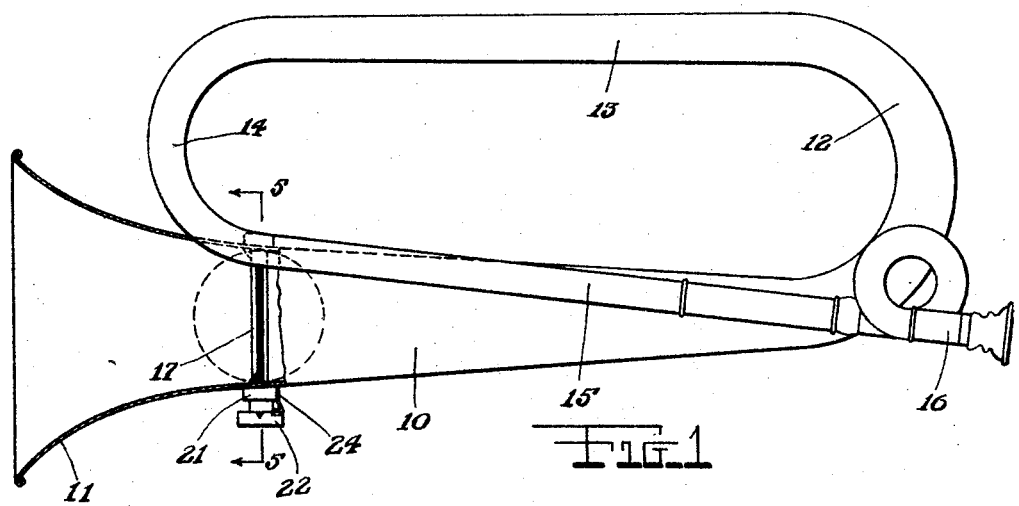
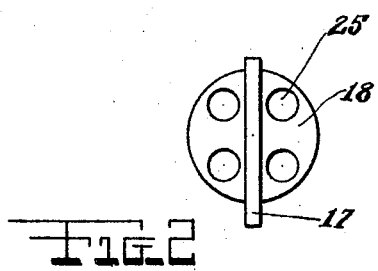
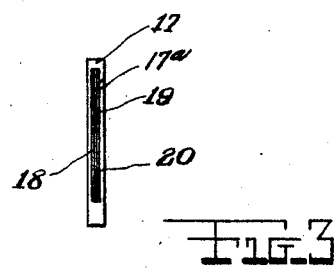
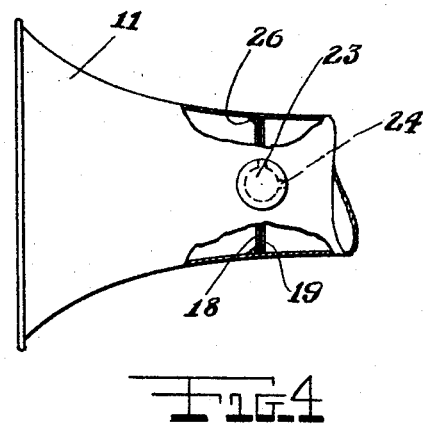
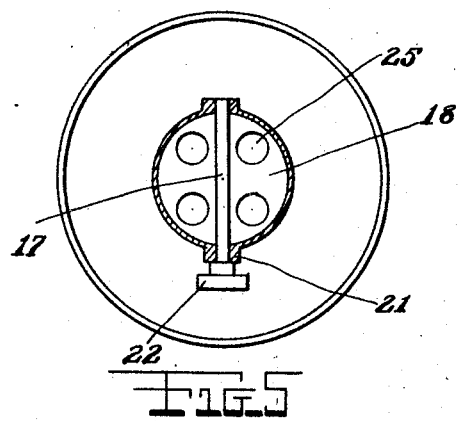
INVENTOR
O. Gantner
BY  J. Ledermann
ATTORNEY Patented Dec. 31, 1929

1,741,835

UNITED STATES PATENT OFFICE

OTTO GANTNER, OF NEW YORK, N. Y.

DAMPING DEVICE FOR CORNETS

Application filed November 4, 1927. Serial No. 230,987.

The main object of this invention is to provide a diaphragm so constructed that it will dampen or modulate the tone emitted from a cornet or other horned instrument.

Another object of this invention is to provide a cornet with a damping device which may be rotated to the active or inactive position accordingly as desired.

The above and other objects will become apparent in the description below, in which characters of reference refer to like-named parts in the drawing.

Referring briefly to the drawing, Figure 1 is a front elevational view of a cornet showing a portion of the horn broken away to illustrate the mounting of the damping device.

Figure 2 is a front elevational view of the damping device.

Figure 3 is a side elevational view of the same.

Figure 4 is a fragmentary plan view of the horn, showing the damping device mounted thereon.

Figure 5 is a cross sectional view taken on line 5—5 of Figure 1.

Referring in detail to the drawing, the numeral 10 indicates the tapering horn of a cornet. The open end 11 of this cornet is flared outwardly as indicated in Figure 1. The opposite end of the cornet continues as a return bend 12 which is connected to a tubular extension 13. The latter has at its end an additional return bend 14 from which a straight tube 15 continues and passes rearwardly. This tube 15 is provided with the usual mouthpiece 16.

The damping device comprises a stud 17 which is mounted diametrically in the horn 10 beyond the flared end 11. This stud has a longitudinal slot 17$^a$ therein which extends parallel to its longitudinal axis and passes therethrough from one side to the other. In this slot a triple thickness of material is located. The material consists of a pair of metallic diaphragms 18 and 19 which have positioned therebetween a highly vibratory membrane 20, consisting of some organic material, such as gut. One end of the stud passes outwardly from the horn through a lug 21, and the end which projects from the lug has secured thereto a knurled knob 22. The lug has a pair of notches 23 formed thereon which are located at a distance 90 degrees apart and receive the free end of a resilient finger 24 which is anchored to the knob 22.

The diaphragms 18 and 19 each has a plurality of relatively large openings 25 therein. These openings are equally spaced-apart from each other and the openings of one diaphragm align with the openings of the opposite diaphragm 19.

In order to seal the space which would normally exist between the periphery of the diaphragm and the inner surface of the horn 10, a flexible rubber ring 26 is used. This ring seats upon the surface of the outermost diaphragm which would be that indicated by the numeral 18 and its opposite and right-angled surface seats upon the inner face of the horn 10, as indicated in Figure 4.

The device illustrated herein is used in changing the tone of a cornet from the commonly known raucous sound to the more pleasing soft tone. As the cornet is being blown through and when the diaphragms are located in a transverse position in the horn 10, as indicated in Figure 4, the vibrations of the air in the horn impinge on the surface of the membrane 20 which is exposed through openings 25 and vibrations of this membrane, according to the pitch of the vibrations, follow. The vibrations of this membrane are greatly multiplied with respect to the pitch of the tone passing through the cornet and a higher, more pleasing, and soft tone is the result. When it is desired that the cornet be used without the damping device the knurled knob 22 is rotated so that the resilient finger 24 is released from the notch in which it is shown in Figure 4 to the opposite notch located at right-angles thereto, and the horn of the cornet is then entirely open and its natural sound is then heard.

It is to be noted that certain changes in form and construction may be made without departing from the spirit and scope of the invention.

I claim:

1. In combination with a wind musical instrument, a damping device comprising a stud mounted diametrically and rotatably in said instrument and having a longitudinal slot therein, a pair of annular diaphragms having relatively large perforations therein anchored in said slot of said stud, a vibratory gut membrane located between said diaphragms, the vibrations through said instrument impinging on the gut membrane through said perforations, said gut membrane multiplying the vibrations, a knob on said stud exterior of said instrument, and means on said knob cooperating with the instrument for releasably locking the diaphragms and membrane in the active or inactive position.

2. In combination with a wind musical instrument, a damping device comprising a stud mounted diametrically and rotatably in said instrument and having a longitudinal slot therein, a pair of annular diaphragms having large perforations therein anchored in said slot of said stud, a vibratory gut membrane located between said diaphragms, the vibrations through said instrument impinging on the gut membrane through said perforations, said gut membrane multiplying the vibrations, a knob on said stud exterior of said instrument, a lug on said instrument, said stud passing through said lug, notches on said lug spaced at right-angles to each other, a resilient finger on said knob engaging in one or the other of said notches to lock said membrane and diaphragms transversely or longitudinally in the horn, and a flexible ring seating on said instrument and one of said diaphragms to prevent leakage around said diaphragms.

In testimony whereof I affix my signature.

OTTO GANTNER.